June 2, 1964 F. ZWICKY 3,135,205
CORUSCATIVE BALLISTIC DEVICE
Filed March 3, 1959
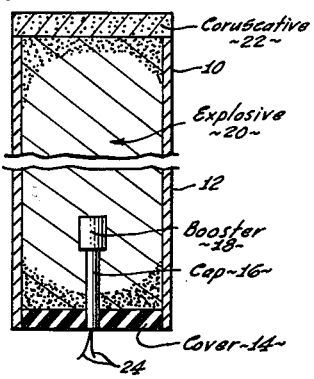
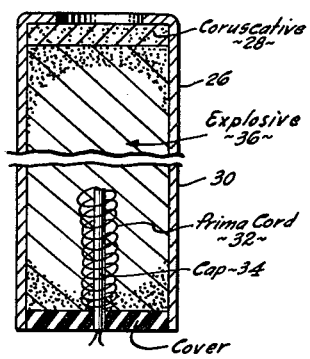
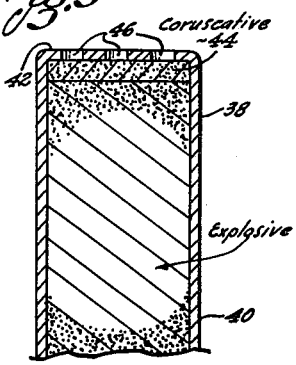
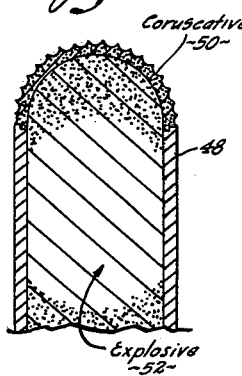
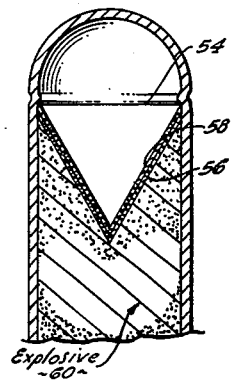
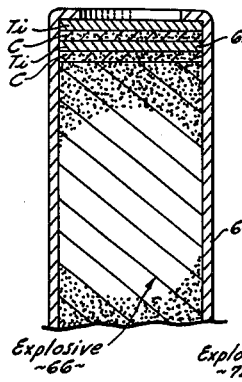
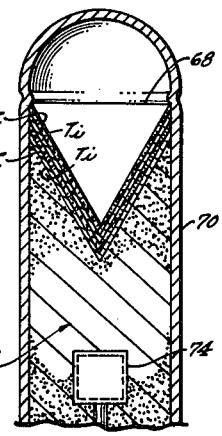
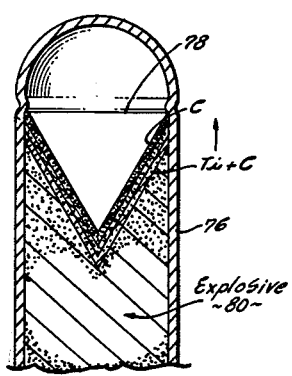
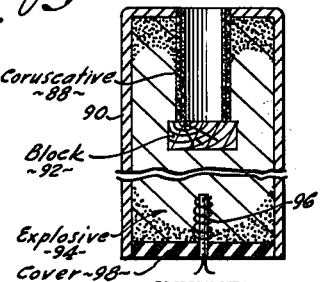
INVENTOR:
Fritz Zwicky
Attorney 3,135,205
CORUSCATIVE BALLISTIC DEVICE
Fritz Zwicky, Pasadena, Calif., assignor to Hycon Mfg.
Company, Pasadena, Calif., a corporation of Delaware
Filed Mar. 3, 1959, Ser. No. 796,913
11 Claims. (Cl. 102—56)

My invention relates generally to ballistic devices and more particularly to a coruscative ballistic device.

Coruscate is derived from the Latin word coruscare meaning "to flash." Coruscate is thus generally defined as "to glitter or gleam in flashes," and more broadly, as "emitting light and heat." Coruscative is, in turn, derived from the word coruscate. Potentially self reactive combinations of solid or liquid reagents which can react fast, generate much heat and produce either solid or liquid reaction products upon reacting, are herein called "coruscatives." Upon ignition, such coruscatives do not fly apart as do conventional explosives. One of the well known combinations of reagents which constitutes a coruscative is iron oxide ($Fe_2O_3$) plus aluminum (Al), forming the welding mixture known as Thermit. On ignition, this mixture reacts and produces iron and aluminum oxide, with a resulting temperature of about 4000 degrees centigrade. Coruscatives therefore yield a high heat of reaction, and the energies generated per unit volume of the original solid or liquid reagents are much greater than that obtained from conventional explosives or propellants. Further, particles composed of the hot reaction products of these coruscatives retain their high temperatures for several minutes and longer.

In any chemical reaction the finite change in the free energy is defined by the equation:

$$\Delta F = (E_2 + PV_2 - TS_2) - (E_1 + PV_1 - TS_1)$$

Where
$\Delta F$ represents the finite change in free energy;
E represents the internal energy per mole;
T is the temperature;
S represents the entropy per mole;
P is the pressure;
V represents the molar volume;
2 indicates the final state after reaction; and
1 indicates the initial state before reaction.

The value of $\Delta F$ may be either positive or negative; however, for the scope of this invention only those reactions in which $\Delta F$ is negative will be considered. Such reactions may be either exothermic or endothermic, but in either case the value of $\Delta F$ must be negative, wherein the decrease in free energy of a system results in the net work obtainable.

Whether a reaction is exothermic or endothermic is determined by the change in heat content $\Delta H$ that takes place during the reaction. If the change in the heat content $\Delta H$ is negative, then heat is given off during reaction and the reaction is exothermic; if the change in the heat content is positive, the reaction is said to be endothermic. The heat content at any equilibrium state of the reaction is expressed by the equation:

$$H = E + PV$$

Where
H represents the heat content;
E represents the internal energy per mole;
P is the pressure; and
V is the molar volume.

Whenever a potentially self reactive composition, or coruscative, which on reaction produces a negative $\Delta F$ greater than zero, is subjected to a sudden shock of sufficient intensity, reaction will be initiated. The sudden shock applied to such potentially self reactive compositions may be in the form of a mechanical shock, a thermal shock, an electric current, an electrostriction such as would be caused by a sudden change in an electrical field, a magnetostriction such as would be caused by a sudden change in a magnetic field, a chemical reaction, a catalytic action, or a radiative shock such as would be caused by impinging light, gamma rays or from corpuscular radiation such as $\alpha$ rays or $\beta$ rays.

I have discovered that in the ordinary form of explosive, which generates on explosion principally gaseous products, the heat generated on explosion is less than 3.0 kilocalories per cubic centimeter of the original composition. I have further discovered that when there is added to an ordinary type of explosive, a proper potentially self reactive composition of particularly solid reagents which upon reacting produce either solid or liquid reaction products, i.e., a coruscative, the energy content of the total original composition and the release of this energy content that can be achieved, will materially exceed the maximum energy content of 3.0 kilocalories per cubic centimeter which characterizes ordinary explosives whose reaction products are gaseous.

A preferred form of shock for initiating the reaction of the solid, potentially self reactive compositions is obtained by placing the self reactive material in contact with a body of explosive and detonating the explosive. The shock of the explosion initiates the reaction which then proceeds at high or low speed, or in a staggered fashion, depending on the type and nature of the components forming the potentially self reactive composition. The explosive used in this manner may be either a solid, liquid, or an explosive gaseous mixture.

The potentially self reactive solid material or coruscative employed in association with the explosive charge may be in the form of a cover, shell or simply an insert. Any of these forms may be either in total or partial contact with a body of explosive. These covers, shells or inserts may be either restrained or unrestrained, that is, they may be solidly attached to some inert body, container or casing which holds the explosive, or they may be just placed in contact with the explosive. The inserts, shells and covers of the potentially self reactive material may be of any desired geometrical configuration or thickness. Varying sizes and thicknesses may be used. The inert restraining covers may likewise be of any desired configuration or thickness and can be made of any inert material such as a metal, an alloy, wood, etc.

When the explosive in any of the noted combinations of explosive and coruscative is detonated, the reaction of the potentially self reactive material is initiated, and reacted, reacting, and possibly some unreacted particles of the material will be ejected at high velocity by the force of the explosion, coupled with force derived from some of the heat (energy) generated by the self reacting material. Among the particles thus released will be a fraction of solid particles and liquid droplets. These will be associated with elementary atomic or molecular reaction products and the proportions of each for any reaction will vary depending on the nature of the original components forming the potentially self reactive compositions.

The explosive used to provide the force for initiating the reaction may be any solid, plastic, liquid or gaseous type explosive as desired. Examples of solid explosives are: pentaerythritol tetranitrate, cyclotrimethylene trinitramine, trinitrotoluene and the like. Examples of liquid explosives are: nitroglycerine, nitroglycol, sensitized nitromethane, etc. Examples of plastic explosives are nitrocotton explosives and the so-called double base powders, consisting of plastic mixtures of nitroglycerine and nitrocotton. Examples of purely gaseous explosives are: mixtures of hydrogen and oxygen, and mixtures of acetylene and oxygen.

The amounts of energy released on detonation of some well known explosive materials that generate only gas are approximately as follows:

| | Kcal./cubic centimeter |
|---|---|
| $CH_3NO_2$ (nitromethane) | 1.20 |
| $C_3H_5N_3O_9$ (nitroglycerine) | 2.40 |
| $C_3H_6N_6O_6$ (RDX) | 2.22 |
| $C(CH_2ONO_2)_4$ (PETN) | 2.48 |
| $C_7H_5N_3O_6$ (trinitrotoluene) | 1.04 |

I form the potentially self reactive combinations by mixing and/or molding solid and solid, or solid and liquid substances that are capable of reacting with each other, into a desired configuration. These combinations can comprise mixtures of chemical elements that are capable of reacting with each other and forming predominantly solid or liquid reaction products at the temperature of reaction; combinations of elements and molecules such as oxides of certain elements that form solids; or a metal and a different metal oxide, halide or sulfide. These types of materials upon reaction will produce solid-solid or solid-liquid reaction products.

Examples of compositions suitable for the purpose of this invention are as follows:

*Example I*

$$Ti + C \rightarrow TiC + Q$$

$Q = 110$ kcal./gr. mole of reagents
$q_m = 1.83$ kcal./gram
$q_v = 6.61$ kcal./cm.$^3$

*Example II*

$$Ca + 2Si \rightarrow CaSi_2 + Q$$

$Q = 220$ kcal./gr. mole of reagents
$q_m = 2.3$ kcal./gram
$q_v = 4.50$ kcal./cm.$^3$

*Example III*

$$Fe_2O_3 + 2Al \rightarrow 2Fe + Al_2O_3 + Q$$

$Q = 181.5$ kcal./gr. mole of reagents
$q_m = 0.85$ kcal./gram
$q_v = 3.60$ kcal./cm.$^3$

*Example IV*

$$2Al + 3Na_2O_2 \rightarrow Al_2O_3 + 3Na_2O + Q$$

$Q = 439$ kcal./gr. mole of reagents
$q_m = 1.52$ kcal./gram
$q_v = 4.25$ kcal./cm.$^3$

*Example V*

$$8B + 3KClO_4 \rightarrow 3KCl + 4B_2O_3 + Q$$

$Q = 1200$ kcal./gr. mole of reagents
$q_m = 2.40$ kcal./gram
$q_v = 5.80$ kcal./cm.$^3$

*Example VI*

$$8Al + 3KClO_4 \rightarrow 3KCl + 4Al_2O_3 + Q$$

$Q = 1520$ kcal./gr. mole of reagents
$q_m = 2.25$ kcal./gram
$q_v = 5.85$ kcal./cm.$^3$

*Example VII*

$$3PbO_2 + 4Al \rightarrow 2Al_2O_3 + 3Pb + Q$$

$Q = 565$ kcal./gr. mole of reagents
$q_m = 0.68$ kcal./gram
$q_v = 4.83$ kcal./cm.$^3$ where Q represents the heat/gram mole of total reagents; $q_m$ is the heat/unit mass (gram); and $q_v$ is the heat/unit volume (cm.$^3$).

It has been stated that reaction of a solid, potentially self reactive composition can be initiated by placing the self reactive material or coruscative in contact with a body of explosive and detonating the explosive. The shock of the explosion initiates the reaction, and reacting particles are ejected at high velocities. However, such reaction is not always easily initiated, and it is sometimes difficult to get a coruscative to start and go to completion fully and effectively. This is often true even where a large amount of explosive is used in conjunction with a relatively small amount of coruscative material.

It is an object of my invention to provide a coruscative ballistic device having coruscative material in contact with a body of explosive wherein initiation of reaction of the coruscative material can be efficiently accomplished.

Another object of this invention is to provide a coruscative ballistic device wherein there is included a coruscative insert which can be immediately and completely initiated into reaction on detonation of an ordinary explosive in contact with the coruscative insert.

A further object of the invention is to provide in a coruscative ballistic device, a shaped charge liner or insert for the generation of jets of increased penetrating power.

Another object of my invention is to provide a coruscative ballistic device wherein its coruscative insert has a significantly excess amount of reducing or oxidizing reactant.

Still another object of this invention is to provide a coruscative insert, in a coruscative ballistic device, wherein the insert can be wholly and essentially instantaneously ignited, and will yield excellent directive properties for the hot molten jet produced from the reacting insert.

Briefly, the foregoing and other objects are preferably accomplished by providing a coruscative insert generally at one end of a casing containing an explosive charge. The insert is preferably placed in direct contact with the explosive and normally comprises a multiple layer or laminated coruscative body which can be in the form of a compacted disc, or liner for a shaped charge. Excess reducing or oxidizing reactant material can be incorporated directly in the insert or liner, or can be supplied indirectly by providing appropriate material for (casing) structure housing the coruscative.

My invention possesses other objects and features, some of which together with the foregoing, will be set forth in the following detailed description of preferred embodiments of the invention. The invention will be more fully understood by reading the description with joint reference to the attached drawings, in which:

FIGURE 1 is a drawing showing a sectional view, taken along a central longitudinal axis of a symmetrical coruscative ballistic device having an unrestrained coruscative insert;

FIGURE 2 is another sectional view drawing, similar to that of FIGURE 1, of a symmetrical coruscative ballistic device having a restrained coruscative insert to facilitate initiation of reaction by shear action;

FIGURE 3 is a fragmentary drawing showing a sectional view of a slightly different version of coruscative ballistic device which is similar to that of FIGURE 2 but having a closed perforated end to provide greater shear action and to produce a scattering of reacting particles;

FIGURE 4 is another fragmentary, sectional view drawing illustrating a self shearing coruscative shell used in a coruscative ballistic device;

FIGURE 5 is a sectional view drawing of a coruscative ballistic device having a conical, double layer coruscative insert liner forming a shaped charge;

FIGURE 6 is a sectional view drawing similar to that of FIGURE 2 but having a coruscative insert which is laminar;

FIGURE 7 is a sectional view of a coruscative ballistic device having a laminar conical insert liner which is used with explosive in a shaped charge arrangement;

FIGURE 8 is a drawing showing a sectional view similar to that of FIGURE 7 except that a conical insert liner having laminations which are varied in concentration of different coruscative material is depicted;

FIGURE 9 is a sectional view of a coruscative ballistic device having coruscative laminations which fill a dome of suitable material that can provide a supply of excess reducing or oxidizing reactant; and FIGURE 10 is a drawing showing a sectional view of a coruscative ballistic device having a cylindrical coruscative insert.

A simple coruscative ballistic device 10 is illustrated in FIGURE 1. The device 10 comprises a cylindrical tube 12 which can be a thin walled aluminum tube about 3 inches in diameter and approximately 10 inches long, for example. Corresponding lengths of similar structures should be approximately 3½ times the diameter (or average width) in general, for a preferred arrangement. A lower cover 14 is used to close the lower opening of tube 12. The cover 14 can be a rubber, plastic, wood or metal disc which is pressed flatly into the lower end of tube 12 as shown. A firing cap 16 is pushed through a small central aperture in the cover 14 so that the cap 16 is held in an upright position, the tubular axis of the cap being generally perpendicular to the plane of the cover 14. A booster 18, tetryl for example, is positioned at the uppermost end of the firing cap 16, and the tube 12 is suitably filled or packed with a conventional explosive 20. A coruscative disc 22 approximately 3 inches in diameter and ½ inch thick, for example, is placed on the top end of the tube 12 in contact with the explosive 20. The coruscative disc 22 is compacted from a uniform mixture of coruscative material such as titanium and graphite (Ti+C), using pressures up to nearly 100,000 p.s.i. Other coruscatives similar to those disclosed in the previous coruscative reactions can, of course, be used. The firing cap 16 can be electrically ignited through electrical leads 24, to detonate the booster 18 and explosive 20.

The device 10 is set in an upright position for the example described. If the device 10 is to be used in any other position than that shown in FIGURE 1, the coruscative disc 22 can be attached in any suitable manner to the top edges of the tube 12. However, in the instance where the coruscative disc 22 is only laid directly on top of the tube 12, it was found that the weight or inertia of the coruscative disc 22 acting against the force of the explosion when the explosive 20 is detonated, was sufficient to cause shearing of the coruscative disc 22 and initiation of reaction of the coruscative material. Once the coruscative material is reacting, it generates tremendous heat which is actually partially converted and added to some extent in the form of kinetic energy to the force of the explosion due to the explosive 20. Thus, the reacting and reacted particles can achieve velocities much greater than that possible if the coruscative disc 22 was only fabricated from inert material.

An improved version of a coruscative ballistic device 26 is shown in FIGURE 2. A coruscative disc 28 is restrained by the bent-over top edges of a cylindrical tube 30 which is generally similar to the tube 12 of FIGURE 1. Instead of using a tetryl booster, prima cord 32 wrapped helically about firing cap 34 can be employed. The action of detonating explosive 36 is, of course, similar to before, but it was found on test that this version of coruscative device was more effective in initiating reaction of the coruscative material because the coruscative disc 28 is sheared more efficiently by the restraining upper edges of the tube 30. The version of coruscative device 38 shown in FIGURE 3 having a tube 40 which has a closed but perforated upper end 42 was found even more effective in initiating reaction, and additionally, produced a scattering or spraying of reacting particles of the coruscative disc 44. The holes 46 can be circular and of uniform size positioned equally spaced in concentric rings about the center of the upper end 42.

A coruscative ballistic device 48 having a generally unrestrained coruscative hemispherical shell 50 of potentially self reactive material in contact with a body of explosive 52 is shown in FIGURE 4. The shell 50, as illustrated in the cross sectional view, can be molded under pressure to form a structure which has an outer surface that is uniformly covered with hemispherical depressions as indicated in FIGURE 4. This dome structure fosters multiple shearing of the coruscative shell 50 and formation of jets of self reacting particles on detonation of the explosive 52, so that reaction is initiated uniformly throughout the coruscative shell 50. The unrestrained shell 50 is thus rendered substantially completely reacting, and a fuller and greater amount of energy is instantaneously generated and available. All of the ejected particles are reacting and the higher velocities derived from such reaction (coupled with force of the explosive) are achieved for all of the scattered particles.

The formation of liners for shaped charges is illustrated in FIGURE 5. A thin, 60 degree apex, coruscative cone 54, for example, can comprise a thin, spun aluminum cone 56 which is coated with potassium chlorate ($KClO_4$) as an upper cone layer 58. Detonation of the explosive charge 60 causes the insert cone 54 to collapse which produces a shearing action throughout the length of the inclined walls, igniting the coruscative materials. The casing containing the explosive 60 and insert cone 54 can be of thin aluminum, for example, and has a hemispherical upper end which is integral with the casing or which can be suitably attached to the lower cylindrical portion of the casing. An attachable upper end can be fabricated from various materials, as desired according to the intended use of the device. By having the aluminum and potassium chlorate in two adjacent layers, as shown, collapse of the liner by the explosive force and heat impels one layer against the other such that one material is assured direct supply and contact with the other. Reaction of any section is not precluded because of the lack of co-reacting materials. The reacting liner generates large quantities of heat, temperatures up to 6000 degrees centigrade being commonly obtained with coruscatives. The detonation of the explosive 60 causes particles to be ejected in the form of a jet of molten material. If the reactant product has a high boiling point, such as titanium carbide (TiC), the jet is cohesive and there is no spraying of particles. Where aluminum is combined with manganese dioxide ($MnO_2$) to produce aluminum trioxide ($Al_2O_3$) and manganese, the manganese easily evaporates, and spraying of the jet particles results. A medium high boiling point reactant product is, for example, calcium oxide (CaO).

Conventional shaped charge liners are usually of inert metals such as iron or copper. Detonation of the explosive charge causes the metal particles to be ejected in the form of a jet of molten material which travels at very high velocity and has good penetrating power, ordinary maximum velocities being 33,000 ft./sec. When a coruscative liner ignites, however, a jet of self-reacting molten material is ejected, and the coruscative combinations can generate up to 8 kcal./cm.³ energy, compared to less than 3 kcal./cm.³ energy for ordinary explosives which generate gaseous reaction products, at standard temperature and pressure. To achieve gaseous components, the original ordinary solid reactants must be sublimated and the heats of sublimation are thus essentially lost. Further, gases such as H₂O, CO and CO₂ disassociate easily at elevated temperatures and the heats of disassociation are essentially lost. The tremendous heat (energy) of coruscatives coupled with the force of the explosive in a coruscative shaped charge has ejected particles of the coruscative liner measured at velocities of 49,000 ft./sec. Such velocities are greater than the surface escape velocity from the earth, and self reacting particles have been projected into interplanetary space by means of a coruscative ballistic device suitably installed in a rocket.

Insert liners of the types of compositions previously discussed can be used with ordinary explosives to form shaped charges, and when the explosive in contact with the liner is detonated, the reaction between the components in the material will take place; this reaction being preferably of the solid-solid type. The use of such an insert liner in a shaped charge has the following advantages:

(1) A jet formed by ejecting the particles of a potentially self reactive insert can be controlled as to the proportion of solid particles or liquid droplets it will contain.

(2) The penetration and cutting properties of such jets can be widely varied.

(3) The detonation wave will cause the composition of the liner to react, generating large quantities of heat. The ejection of the particles from the liner will take place at higher temperature and higher velocity than those of an inert liner, correspondingly increasing the penetrating and chemical reaction power of the jet.

Since the inserts are self reactive, when these are ejected they can continue to react regardless of the medium through which they travel. This is particularly useful in the creation of artificial meteors which can be employed in various fields of experimentation and may be used in regions where little or no atmosphere is present.

Because of the higher energy density of the combination of an explosive with the solid and/or liquid potentially self reactive materials described, the fragmentation of inert solid shells or covers, surrounding such combinations, proceeds more violently and more uniformly than it would if the solid shell, etc. were acted upon by an ordinary explosive only, which has a lower energy density.

Likewise, because the combination of an explosive with the solid and/or liquid potentially self reactive material described is capable of developing much greater energy, the blasting of rock or solids can be accomplished by using smaller bores with correspondingly smaller quantities of the combination.

If the combined explosive and solid and/or liquid potentially self reactive composition are used for propelling projectiles from guns, the loading space can be made smaller and the guns stronger than when conventional explosives are used. Because of the possibility of staggered explosions, the time sequence of the pressures generated can be adjusted to impart improved muzzle velocities to the projectiles.

A laminar form of coruscative disc 62 is employed in a coruscative ballistic device 64 as shown in FIGURE 6. A titanium and carbon coruscative combination is indicated only as an example in FIGURE 6 (and FIGURE 7). Extremely thin layers are used so that in one version where the structure is produced by vacuum deposition of successive layers, the layers were only about 50 to 100 molecules thick. While presently somewhat tedious and lengthy to accomplish, the effect is that molecules of one reactant material are positioned directly before the other co-reactant material, and when the explosive 66 is detonated, the coruscative disc 62 appears to react instantaneously and in entirety. Where the coruscative disc is pressed from a mixture, as was done in the embodiments of FIGURES 1 through 4, an essentially solid wall of titanium, for example, is not presented to the carbon atoms which must each combine with a titanium atom. Immediate interaction at the start may not occur with a coruscative mixture but does take place where laminations of potentially self reacting materials are utilized in planes generally parallel with the detonation wave front of the explosion. Ideally a layer or two of atoms or molecules of one coruscative material is placed adjacent another layer or two of atoms or molecules of the other coruscative material.

A laminated shaped charge insert 68 of a conical configuration in a coruscative ballistic device 70 is illustrated in FIGURE 7. The laminations are exaggerated in thickness, and only a few layers are shown, for clarity. The conical insert 68 is only about 3 millimeters thick, for example. A conventional explosive charge 72 is contained in a casing similar to that of FIGURE 5, and the explosive 72 is in direct contact with the lower surface of the conical insert 68, and fuze 74 can be a conventional timed or inertial type fuze. A conical insert 68 has been shown because such inserts collapse toward the central longitudinal axis of the cone along with the advancing detonation wave front to produce a well defined and directed molten jet in the direction of the longitudinal axis. It is apparent that the inserts can be variously shaped to line cavities which are, for example, spherical, cylindrical, parabolic, or hyperbolic. Such alternate shapes can be used where appropriate, but the directive properties of the inverted right circular cone and effectiveness of reaction was found especially good in tests.

A gradient of concentration of coruscative materials can be provided in an insert for a coruscative ballistic device. The device 76 shown in FIGURE 8 has an insert 78 positioned against an explosive charge 80, similar to the embodiment of FIGURE 7. The lowermost layer of the conical laminated insert 78 is, however, a mixture of coruscative material in stoichiometric proportions. This is indicated in FIGURE 8 as a mixture of titanium and carbon. The concentration of carbon gradually increases in discrete incremental steps until the last uppermost layer consists entirely of carbon, as indicated by the small arrow. This incremental step gradient can have extremely small (infinitesimal) steps. The overall insert proportions can be represented as having an excess of carbon, Ti+C+XC, where X can have any value, for example, from at least approximately 0.25 to 1. The value of X is selected for the intended application of the device, of course.

An excess of aluminum is indicated in the following coruscative reaction:

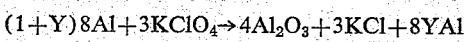
$$(1+Y)8Al+3KClO_4 \rightarrow 4Al_2O_3+3KCl+8YAl$$

If the excess aluminum is intended to provide additional reaction with water, for example, the value of Y can be as high as approximately 3, for complete utilization. The reaction temperature is roughly 6000 degrees centigrade, and a temperature of about 1000 degrees centigrade is needed for hydrolysis of water by hot aluminum. The heat change produced in the above reaction is sufficient to sustain very roughly 24 excess atoms of aluminum at a high enough temperature for hydrolysis of water.

The well known coruscative combination in the Thermit reaction can be used to summarize three useful results of coruscatives.

(1) Stoichiometric example.

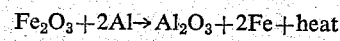
$$Fe_2O_3+2Al \rightarrow Al_2O_3+2Fe+heat$$

This reaction yields molten iron which can be used for penetration of armor, particularly when obtained from an insert or liner for a shaped charge. The hot molten iron can also be used for incendiary purposes.

(2) Excess reducing reactant example.

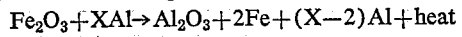
$$Fe_2O_3 + XAl \rightarrow Al_2O_3 + 2Fe + (X-2)Al + heat$$

Where X is greater than 2.

The thermally excited excess aluminum is capable of additional reaction with a suitable "target" material. The hot excess aluminum would react with sea water, for example, forming aluminum oxide and liberating free hydrogen under very high pressure, which in turn is capable of combining with oxygen in air to give even further destructive power.

(3) Excess oxidizing reactant example.

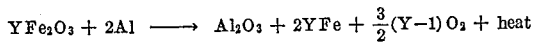
$$YFe_2O_3 + 2Al \longrightarrow Al_2O_3 + 2YFe + \tfrac{3}{2}(Y-1)O_2 + heat$$

Where Y is greater than 1.

This reaction yields an excess of thermally excited free oxygen which is capable of additional reaction with target material such as aluminum skin on aircraft or missiles.

Excess reactant material is usually provided by supplying a surplus of one of the coruscative materials directly in the coruscative mixture or laminations. However, it is readily possible to provide the excess in the manner illustrated in FIGURE 9. Here, a closed dome 82 which can be aluminum, magnesium, etc. according to the coruscative combination 84 used to fill the dome 82, is actually the excess reactant material. When the explosive 86 is detonated, the dome 82 is propelled upwards in FIGURE 9 and the detonation shock initiates reaction of the coruscative 84 in the dome 82. The dome 82 is restrained initially at its lower edges but is easily sheared loose by force of the explosion. The heat of reaction quickly reduces the dome and its contents into a molten mass which includes the excess dome material. It was found, however, in test that ignition or initiation of reaction was more difficult here than with the highly efficient conical insert version described above where good shear action results.

A coruscative ballistic device having a cylindrical insert liner 88 is shown in FIGURE 10. The cylindrical insert liner 88 is positioned centrally in casing 90 which has a central cutout in its generally closed upper end. The insert liner 88 extends inwards and terminates at the normally upper surface of block 92 which can be a block or disc of wood or plastic, for example. Ordinary explosive 94 such as a type called Jet-X can be used to fill the casing 90 generally surrounding the insert liner 88 and block 92. The explosive can be ignited by igniter means 96 which is generally held in an upright position as shown by the normally lower cover 98. The insert liner 88 can be fabricated from a coruscative mixture similar to that used for forming the coruscative inserts of FIGURES 1 through 4, but the insert liner 88 is preferably constructed in thin layers or laminations similar to the conical insert liner shown in FIGURE 7. The block 92 can be omitted if desired but is preferably included in a coruscative ballistic device. The function of the block 92 is to cause the force of the explosion, when the explosive 94 is detonated, to be directed generally laterally against the wall surface of the insert liner 88. The explosive force exerted against the cylindrical wall of the insert liner 88 toward its central longitudinal axis causes the insert liner 88 to collapse together to form an integral self reacting mass.

The action of a coruscative ballistic device can be explained rather simply by analogy where a relatively thin disc is dropped flatly into a body of water, both being at normal temperatures, and then dropping the disc when it is extremely hot. When the disc is at a normal temperaturer, the disc will sink immediately into the water. However, when the disc is extremely hot, the water will vaporize where the hot disc strikes the surface of the water and the vaporization exerts a force up against the disc. In a coruscative ballistic device, when the conventional explosive is detonated, the explosive shock is directed against the coruscative insert causing it to ignite or initiate reaction. As soon as this occurs, tremendous heat is generated which interacts in part with the explosive (gas molecules) force causing a superimposed or added force action. Since force and reaction must be equal, the reacting coruscative particles are accordingly given added kinetic energy and extremely high velocities are obtained. The coruscative ballistic device can be compared with a two stage rocket.

It is to be understood that the particular embodiments of my invention described above and shown in the drawings are merely illustrative of and not restrictive of the broad invention, and that various changes in design, structure and arrangement may be made without departing from the spirit and scope of the broader of the appended claims.

I claim:

1. A coruscative ballistic device adapted to impact against a target object which is substantially composed of material adapted to become part of the coruscative reaction, said device comprising: a body of explosive; means for detonating said body of explosive; a multiple layered body of potentially chemically reactive ingredients having at least two alternate layers of each of said reactive ingredients in a self-reactive composition responsive to the detonation of said body of explosive to react and to yield predominantly solid and liquid reaction products, the ingredients in one layer of said multiple body reacting with the ingredients in the immediately adjacent layer, wherein a substantial excess of amount of an ingredient is provided in a layer, over stoichiometric proportion, for reaction of the ingredients to provide excess thermally excited reactant on reaction, said excess reactant adapted to combine coruscatively with the material composing said target object.

2. The invention according to claim 1 wherein said multiple layered body of potentially chemically reactive ingredients includes the ingredients Ti and C being individually present in separate layers proportions of one mole of Ti to one mole of C.

3. The invention according to claim 1 wherein said multiple layered body of potentially chemically reactive ingredients includes the ingredients Ca and Si, the Ca and Si being individually present in separate layers in layered proportions of one mole of Ca and two moles of Si.

4. The invention according to claim 1 wherein said multiple layered body of potentially chemically reactive ingredients includes the ingredients $Fe_2O_3$ and Al, the $Fe_2O_3$ and Al being individually present in separate layers in layered proportions of one mole of $Fe_2O_3$ to two moles of Al.

5. The invention according to claim 1 wherein said multiple layered body of potentially chemically reactive ingredients includes the ingredients Al and $Na_2O_2$, the Al and $Na_2O_2$ being present in proportions of two moles of Al to three moles of $Na_2O_2$.

6. The invention according to claim 1 wherein said multiple layered body of potentially chemically reactive ingredients includes the ingredients B and $KClO_2$, the B and the $KClO_4$ being present in proportions of eight moles of B to three moles of $KClO_4$.

7. The invention according to claim 1 wherein said multiple layered body of potentially chemically reactive ingredients includes the ingredients Al and $KClO_4$, the Al and the $KClO_4$ being present in proportions of eight moles of Al to three moles of $KClO_4$.

8. The invention according to claim 1 wherein said multiple layered body of potentially chemically reactive ingredients includes the ingredients $PbO_2$ and Al, the $PbO_2$ and Al being present in proportions of three moles of $PbO_2$ to four moles of Al.

9. The invention according to claim 1 wherein said body of explosive is provided with a cavity at one side thereof and in which said multiple layered body of potentially chemically reactive ingredients forms a liner for said cavity.

10. The invention according to claim 9 wherein the cavity is a right circular cone.

11. The invention according to claim 1 wherein said multiple layered body of potentially chemically reactive ingredients has its layers arranged in a gradient of concentration from stoichiometric proportions of ingredients progressively increasing in concentration of at least one ingredient to exclusion of the other ingredients.

References Cited in the file of this patent

UNITED STATES PATENTS

| | | |
|---|---|---|
| 1,882,365 | Lubelsky | Oct. 11, 1932 |
| 2,569,956 | Schiltknecht | Oct. 2, 1951 |
| 2,605,703 | Lawson | Aug. 5, 1952 |
| 2,628,559 | Jasse | Feb. 17, 1953 |
| 2,667,836 | Church et al. | Feb. 2, 1954 |
| 2,717,204 | Noddin et al. | Sept. 6, 1955 |
| 2,789,004 | Foster | Apr. 16, 1957 |
| 2,805,145 | Henderson et al. | Sept. 3, 1957 |
| 2,972,948 | Kray | Feb. 28, 1961 |
| 2,992,095 | Li | July 11, 1961 |
| 3,054,938 | Meddick | Sept. 18, 1962 |

FOREIGN PATENTS

| | | |
|---|---|---|
| 551,007 | Belgium | Sept. 29, 1956 |